July 26, 1960     H. E. KALTER     2,946,372
BICYCLE SADDLE CLAMP
Filed Oct. 2, 1957
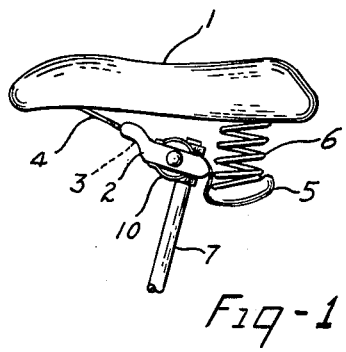
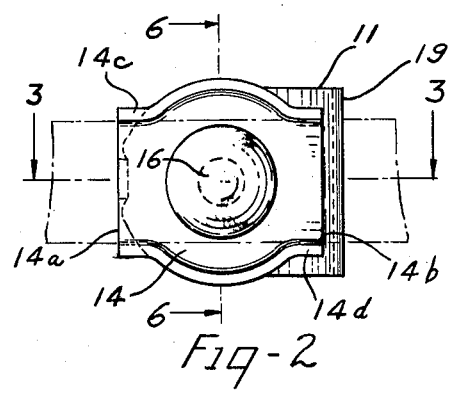
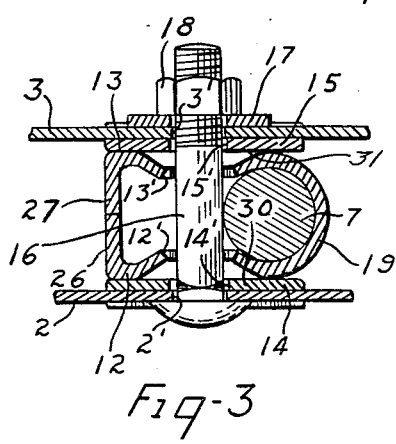
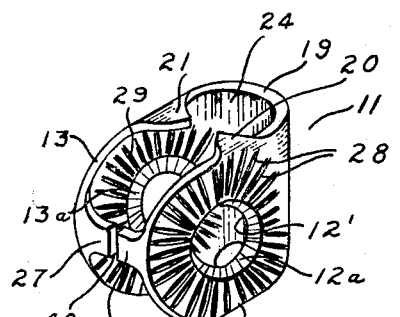
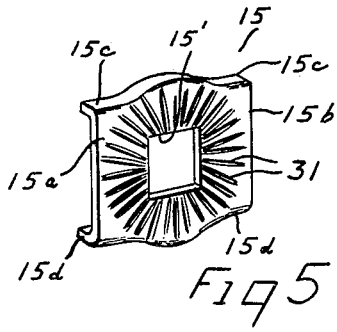
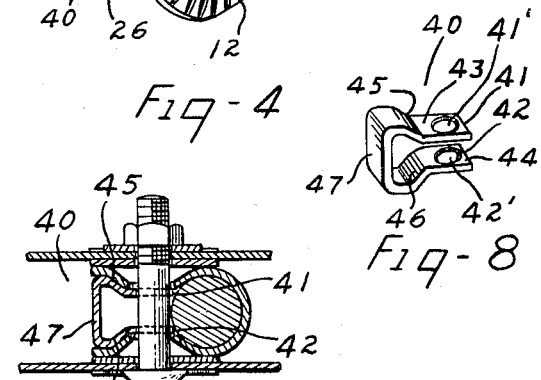
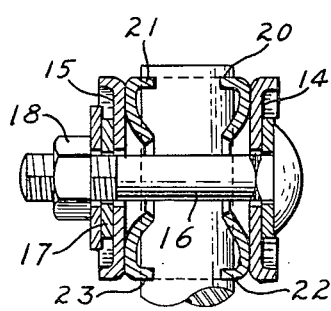
INVENTOR.
Harold E. Kalter
BY United States Patent Office 2,946,372
Patented July 26, 1960

2,946,372
BICYCLE SADDLE CLAMP

Harold E. Kalter, Elyria, Ohio, assignor to Troxel Manufacturing Company, Elyria, Ohio, a corporation of Ohio Filed Oct. 2, 1957, Ser. No. 687,799

2 Claims. (Cl. 155—5.24)

My invention relates to saddles for bicycles or similar type vehicles and more particularly to an improved clamp for securing a saddle to a cycle saddle post.

In mounting a saddle upon the saddle post of a bicycle, it is desirable that the saddle be tiltably adjustable in a forward and rearward direction to provide a comfortable seat for the rider. Once the preferred adjustment has been made, it is necessary that the saddle be firmly clamped in position and that it does not move under the weight of a person seated thereupon. One of the most frequent complaints received by saddle manufacturers is that the adjustable clamps will not hold the saddle in its adjusted position.

A common method of securing the saddle in the desired adjusted position is that of providing a pair of clutch plates mounted upon the saddle post and a matching pair of clutch plates engaging the reach members of the saddle. Each of said clutch plates is preferably provided with radiating, V-shaped grooves in its clutching surface whereby said grooves interengage the grooves of the mating clutch plate in a plurality of circumferentially adjusted positions. Suitable, axially aligned apertures are provided in the clutch plates and reach members whereby a bolt is projected therethrough, and by means of a nut upon the threaded end of said bolt, the clutch plates are tightly engaged to prevent tilting of the saddle.

The clutch plates which are mounted upon the saddle post are ordinarily formed of a single stamping of sheet metal the central portion of which is arcuately shaped to fit the convex surface of the saddle post. The clutch plates project forwardly beyond said post, their outwardly projecting edges being free. When the nut and bolt are tightened, the forward edges of the clutch plate are forced laterally inwardly a greater distance than the rearward edges whereby the engaging surfaces of the plates do not clutch in a circumferentially uniform manner. This condition frequently results in the saddle pivoting out of its adjusted position after the bolt and nut are tightened.

An example of the above described type of clamp is disclosed in my United States Letters Patent No. 2,414,954, issued January 28, 1947.

It is, therefore, an object of my invention to provide a saddle clamp of improved design whereby tilting of the saddle after adjustment thereof is prevented.

Another object of my invention is to provide a saddle clamp wherein the clutch plates engage uniformly throughout the entire circumference of their mating surfaces.

Still another object of my invention is to provide a clamp as referred to above having parallel clutch plates which will resist distortion and disalignment after repeated tightening and loosening of the clamping bolt.

A further object of my invention is to provide a saddle clamp which more positively grips the saddle post to prevent rotation of the saddle thereupon.

A still further object of my invention is to provide improved means adapted to be associated with a saddle clamp to provide the advantages hereinbefore set forth.

Other objects and advantages of my improved saddle clamp will become evident to those skilled in the art to which it appertains by a study of the following specification and the appended drawings in which:

Fig. 1 is a side plan view of a bicycle or similar cycle type saddle mounted upon a saddle post;

Fig. 2 is an enlarged, side plan view of the clamping device of Fig. 1;

Fig. 3 is a section taken along the line 3—3 of Fig. 2;

Fig. 4 is a perspective view of the inner clutch plate bracket of my invention as shown in Figs. 1 to 3 inclusive;

Fig. 5 is a perspective view of one of the outer clutch plates;

Fig. 6 is a section taken along the line 6—6 of Fig. 2;

Fig. 7 is a view similar to Fig. 3 showing a second embodiment of my invention; and Fig. 8 is a perspective view of the spacer element of Fig. 7.

Referring now to the drawings in all of which like parts are designated by like reference characters, in Figs. 1 to 6 inclusive, I show a preferred embodiment of my invention. My invention is preferably applied to a conventional saddle and reach assembly which comprises a pair of generally parallel flat metal reach members 2 and 3 joined at their forward end by resilient means 4 projecting forwardly thereof and suitably secured to the lower side of the pommel end of the saddle. The reach members 2 and 3 are preferably formed at their rear ends into laterally interspaced spring supports 5 having coil springs 6 mounted thereon, which coil springs are secured at laterally interspaced portions thereof to the lowermost portion of the cantle end of the saddle.

The saddle 1 and reach assembly in both forms of my invention, the form shown in Figs. 1 to 6 inclusive and the form shown in Figs. 7 and 8, are mounted upon a saddle post 7 by means of improved clamping means of my invention.

In the form of my invention shown in Figs. 1 to 6, the clamp is generally designated by the reference numeral 10 and comprises a substantially U-shaped strap member 11 having apertured outwardly serrated relatively interspaced parallel inner clutch plates 12 and 13 and the customary inwardly serrated suitably formed apertured outer clutch plates 14 and 15, which are adapted to be secured to reach members 2 and 3 and to be interposed between the said reach members and the said U-shaped strap. A bolt 16 having a washer 17 and nut 18 upon the threaded end thereof projects through the aligned apertures 2', 3', 12', 13', 14' and 15' in the reach members, inner clutch plates, and outer clutch plates, respectively, to secure the clamp and reach members together. By the clamping means herein shown, as is well known, the reach members 2 and 3 may be adjustably rigidly positioned in the correct angular relationship in and to the top of the saddle post 7.

By referring to the figures of drawing, it will be noted that the web 19 of the U-shaped strap member 11 integrally unites the inner clutch plates 12 and 13 and is concavely rounded to conform to the outer peripheral surface of the post 7. Forwardly of the web 19, the U-shaped member 11 has inwardly projecting ears 20 and 21 at its upper edges which are also shaped to substantially conform to the post 7, and the lowermost edges of said U-shaped bracket are provided with complementary, inwardly projecting ears 22 and 23 (see Fig. 6). The web 19 and the ears 20, 21, 22 and 23 form an effective socket 24 into which the post 7 is interfitted.

The forward, rounded edges of the clutch plates 12 and 13 have inwardly directed, oppositely positioned lugs 26 and 27, the innermost ends of which are adapted to abut each other when the clamp assembly 10 is tightened by means of the bolt 16 and the nut 18.

The clutch plates 12 and 13 are provided with V-shaped grooves 28 and 29 respectively formed into the outwardly facing, clutching surfaces thereof, said grooves radiating from the axial center of the apertures 12' and 13'. The inner peripheries of said apertures are inwardly dished at 12a and 13a whereby the clutch plates 12 and 13 are strengthened against distortion under pressure.

In Fig. 5 I show one of the outer clutch plates, 15. It will be understood that both clutch plates 14 and 15 are substantially identical and that they are provided with V-shaped, radiating grooves 30 and 31 on the inwardly directed surfaces thereof adapted to interfit and engage the grooves 28 and 29. The area of the outer clutch plate 15 which is grooved is substantially circular, said clutch plate extending forwardly and rearwardly beyond said circular portion to form channel shaped extensions 15a and 15b having right angularly bent guide walls, 15c and 15d. Clutch plate 14 is similarly formed with extensions 14a and 14b and guide walls 14c and 14d. The guide walls of the clutch plates 14 and 15 are so interspaced as to engage the reach members 2 and 3 respectively which are positioned therebetween whereby said reach members pivot with said outer clutch plates.

Referring now particularly to Figs. 3 and 6, the clamp assembly 10 is assembled with the saddle 1 by placing the outer clutch plates 14 and 15 against the reach members 2 and 3 whereby the guide walls 14c—14d and 15c—15d project outwardly above and below said reach members. The U-shaped clamp 11 is then interposed between the outer clutch plates, and with the apertures 2', 3', 12', 13', 14', and 15' axially aligned, the bolt 16 is inserted and the socket 24 telescoped over the post 7. When the saddle 1 has been adjusted to the desired position, the nut 18 is tightened to compress all of the recited parts. As the bolt is tightened, the lugs 26 and 27 abut each other thereby holding the clutch plates 12 and 13 in substantially parallel relationship. The grooves 28—29 of the inner clutch plates and the grooves 30—31 of the outer clutch plates are firmly interengaged in a uniform manner throughout the entire circumference of their mating surfaces.

By referring to Figs. 3 and 4, the action of the improved clamp 10 under compression will be readily understood. In Fig. 4, I show the U-shaped member 11 in its unstressed condition whereby the lugs 26 and 27 of the clutch plates 12 and 13 are laterally interspaced a short distance. In Fig. 3 I show said U-shaped member in its stressed condition under compression by the tightened bolt 16. Before tightening of the bolt 16, the clutch plates 12 and 13 are, in effect, cantilevered arms capable of being inwardly pivoted or deformed due to the resilience of the rounded web 19. In older and less efficient clamps with which I am familiar, the cantilevered arms are depended upon to provide the resistive pressure to maintain clutching engagement between the pairs of relatively movable clutch plates. This results in the forward edges of the U-shaped member tending to converge since the rearward edges are maintained in their spaced relationship by means of the saddle post, and the result is circumferentially non-uniform clutching of the plates.

In the form of my invention shown in Figs. 7 and 8 an alternate construction is shown. In this construction the inner clamping member 11 is not provided with inwardly extending lugs such as the lugs 26 and 27 provided in the form of my invention shown in Figs. 1 to 6 inclusive. A separate generally U-shaped spacer member 40 is provided with apertures 41' and 42' through which the bolt 16 is adapted to project, and is suspended from the bolt, the yoke 47 thereof thereby achieving the results of the lugs of the prior embodiment. This spacer element 40 as best shown in Figs. 7 and 8 comprises a pair of generally parallel arms 41 and 42 which are bowed at their outer ends 45 and 46 and joined by a yoke 47. The yoke 47 is of such dimension as to be initially slightly spaced from the inner serrated faces of the inner clutch plates 12 and 13 but upon compressive tightening of the clamp 11 by tightening the bolt 16 the clutch plates 12 and 13 are uniformly stressed by reason of the maintenance of the contacted edges of the clamping means in definite spaced relationship. The spacer thus acts as a bridge between the inner clamp members. This spacer element may be adapted for use with the prior art clamps.

In the first embodiment of my present invention, the inward movement of the clutch plates 12 and 13 brings the lugs 26 and 27 into abutting relationship. This condition in the clamping action is quickly reached since the interspacing of said lugs is slight. The clutch plates 12 and 13 are then, in effect, beams bridging between two rigid supports, the post 7 at the rearward end, and the lugs 26 and 27 at the forward end. In the second embodiment, the spacer yoke affords the bridge for the clutch plates 12 and 13. Under compression, therefore, the clutch plates 12 and 13 are uniformly stressed whereby the resistive reaction thereof maintains all clutching surfaces in uniform circumferential engagement.

The present invention also provides a more efficient means of gripping the saddle post 7 at the socket 24. In the above mentioned older type clamps, pressure applied on one side of the saddle post at the clamping bolt tended to pull the web around said post but since the free ends of the cantilevered arms disposed beyond said bolt moved inwardly under this pressure, tightening of said bolt effected a gripping action upon the post only indirectly by a wrapping motion of said yoke. In the present clamp 10, the limited inward movement of the clutch plates 12 and 13 not only causes the yoke 19 to wrap more tightly around the post 7, but due to the fact that said plates are unable to move further than a limited distance toward each other and are maintained in parallel relation to each other, said post is held in a vise-like grip therebetween. In this way the clamping bolt 16 acts more directly upon the post 7, and the grip of the clamp 10 upon said post is more proportional to the tightness of said bolt. I have found this vise-like action of the U-shaped member 11 to be superior to the older and less efficient clamps to which I have referred.

It will be understood that many departures from the details of my invention as it is herein described and illustrated may be made, such as changes in size and dimension, without, however, departing from the spirit of my invention or the scope of the appended claims.

What I claim is:

1. A cycle saddle clamp adapted to engage the reach members of a saddle and to be telescoped over a saddle post in a fixed adjusted position on said post, said clamp comprising outer and inner pairs of centrally apertured clutch plates, said clutch plates having radially grooved clutching surfaces whereby said inner clutch plates engage said outer clutch plates in a plurality of circumferentially adjusted positions, said inner clutch plates being integrally united by means of a web at one edge thereof, and having free ends diametrically opposite said web, a spacer member interposed between said clutch plates, said spacer member comprising a pair of generally parallel arm portions having apertured and non-apertured ends and being joined at the non-apertured ends thereof by means of a yoke, said yoke interposed between the free ends of said clutch plates, said yoke adapted to maintain said free ends of said clutch plates in substantially similar interspaced relationship to the opposite ends of said clutch plates, said outer clutch plates adapted to engage apertured reach members of a cycle saddle, a bolt having a nut thereupon projecting through said apertures in said reach members, said outer and inner pairs of clutch plates, and said arms, said saddle post telescopically interfitted within said web and interposed between said web and said bolt whereby the tightening of said bolt and nut effect sufficient inward distortion of said web and said inner clutch plates to firmly grip said post.

2. A cycle saddle clamp adapted to be telescoped over a saddle post to support a saddle in a fixed adjusted position on said post, said clamp comprising outer and inner pairs of centrally apertured clutch plates, said inner clutch plates being integrally united by means of a concavely rounded web at one edge thereof and having oppositely directed free ends, said clutch plates having inwardly directed ear portions adapted to provide effective continuations of the concave configuration of said web, said web and said ear portions providing a socket whereby said clamp is telescoped over said post, said inner clutch plates being inwardly dished, a spacer member interposed between said clutch plates comprising a pair of arms apertured at the inner ends thereof coaxially with the apertures in said clutch plates, said arms being bowed at the outer ends thereof to conform to the central dished portions of said clutch plates, said arms being joined at the outer ends by a yoke, said yoke being interposed between the free ends of said clutch plates opposite said web, said outer clutch plates adapted to engage apertured reach members of a cycle saddle, a bolt having a nut thereupon projecting through said apertures in said reach members, said spacer arms, and said clutch plates, and said saddle post interposed between said web and said bolt whereby the tightening of said bolt and nut effect sufficient inward distortion of said web and said inner clutch plates to firmly grip said post.

References Cited in the file of this patent

UNITED STATES PATENTS 2,446,933 Jones _____ Aug. 10, 1948

FOREIGN PATENTS 22,394 Great Britain _____ Oct. 17, 1896
825,497 France _____ Dec. 8, 1937